Aug. 1, 1939. H. G. HORNIBROOK 2,167,977
SEALED CONTAINER CONVERTIBLE TO PAIL
Filed May 6, 1937
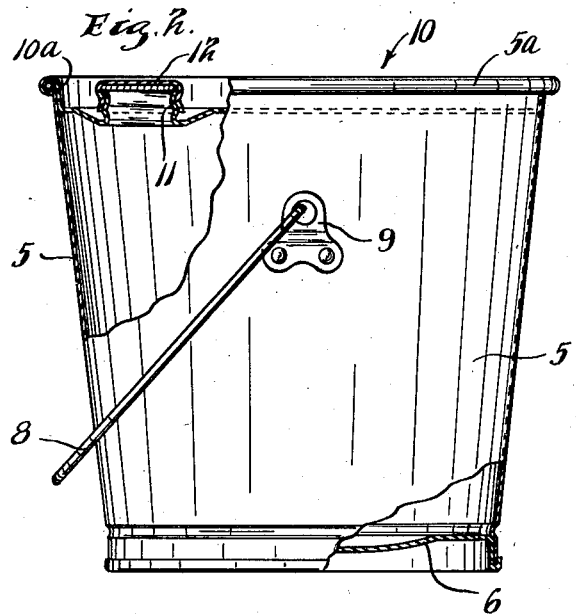
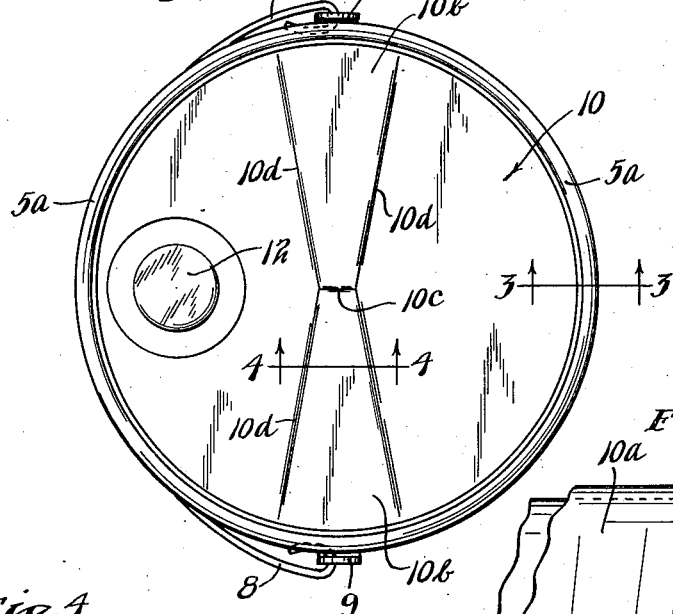
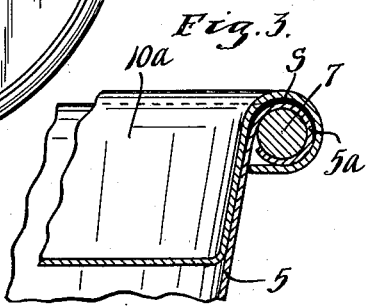
INVENTOR.
HOWARD G. HORNIBROOK.
BY HIS ATTORNEYS.
Williamson & Williamson Patented Aug. 1, 1939

2,167,977

UNITED STATES PATENT OFFICE 2,167,977

SEALED CONTAINER CONVERTIBLE TO PAIL

Howard G. Hornibrook, Minneapolis, Minn.

Application May 6, 1937, Serial No. 141,075

2 Claims. (Cl. 220—27)

This invention relates to covered or sealed containers for liquids and particularly to a sealed container which is readily convertible into an open pail or bucket. Such a structure is capable of very wide use for containing and transporting liquids such as oils, chemicals, paints and other liquids where a sealed contained is necessary and where it is also desirable to give the purchaser a useful premium or gift into which the container may be readily converted; for example, companies selling oil, hydro-carbon fuel, semi-solids or food products may thus offer their customers a premium in the form of an open bucket or pail capable of wide general use.

It is an object of my invention to provide an exceedingly simple, sealed container convertible into an open pail, wherein provision is made for frangibly removing the entire top or closure of the container leaving an open top bucket or pail of conventional form.

More specifically it is an object to provide in a container of the class described, a sealed cover having scored portions operatively arranged with respect to the sealed edges thereof to permit the cover to be readily torn into two or more sections for removal from the container body.

It is a further object to provide in combination with a pail of conventional form having the usual bead at its upper peripheral edge, a sealed cover or closure which cannot be removed from the pail or body unless scored sections thereof are first torn from portions of the cover.

These and other objects and advantages of the invention will be more fully set forth in the following description made in connection with the accompanying drawing, wherein like reference characters refer to the same or similar parts throughout the various views, and in which:

Fig. 1 is a top plan view of a container embodying my invention;

Fig. 2 is a view mostly in side elevation with some portions broken away and others shown in section;

Fig. 3 is a detail vertical section taken on the line 3—3 of Fig. 1 on a somewhat larger scale; and Fig. 4 is a detail vertical section taken on the line 4—4 of Fig. 1, showing a suitable manner of scoring a cover for the purposes herein described.

In the embodiment of my invention shown, the body of the container is in the conventional form of a pail or bucket having an inverted, truncated conical body 5, to the lower end of which is secured the usual bottom 6. The upper edge of the body 5 is rolled about a heavy wire ring 7 to form the usual rounded bead 5a. The container is provided with a swingable bail 8, the ends of which are connected by bent loops with suitable brackets 9 riveted or otherwise secured to the body of the container in diametrically opposite portions thereof.

My container includes a sealed cover 10 having an up-turned flange 10a which telescopically fits plug-like into the upper peripheral edge of the body 5 and the edges of the flange 10a are outturned about the bead 5a, and prior to the turning of said edges a self-hardening sealing substance S is applied to the upper portion of the bead 5a, as will be clearly shown from Fig. 3. The turned extreme edge of the cover 10 is disposed when the cover is applied in juxtaposition to the peripheral wall of the container so that it is practically impossible to insert an instrument for plying off the cover from the body of the container.

The cover is provided with scored sections 10b which, as shown, extend from a central scored line 10c to the up-turned seating flanges and, as shown, each scored section 10b is defined by the central scoring line 10c, and a pair of score lines 10d which diverge from the central line 10c to the peripheral wall of the container body. Score lines 10d are continuous and, if desired, may be extended upwardly for a short distance along the up-turned flange 10a, but preferably do not extend about the turned sealing edge of the cover.

My cover, as shown, is provided with a relatively small spout 11 which may be sealed by a suitable threaded sealing cap 12 surrounding the same.

The score lines are preferably, though not necessarily, made upon the inner side of the cover as shown in Fig. 4.

When constructed as herein disclosed, my container is exceedingly strong and will withstand strains and pressure in shipment, the attachment of the cover re-enforcing the upper end of the body and providing a highly efficient sealing joint with the bead of the container body.

After the contents of the container have been removed, the user may very quickly remove the sealed cover by first severing the central scored portion along the line 10c which may be readily accomplished by striking the same with a screw driver or other implement. The scored portions 10b may thereafter readily be torn from the cover by grasping the same with a pair of pliers and tearing is continued through the flange 10a, thus dividing the cover into two segments both less in area than semi-circular. This, of course, readily facilitates removal of the remaining portions, and the body of the container when the cover is thus removed constitutes a pail of the conventional type which forms a useful premium or gift for the purchaser.

It will, of course, be understood that various changes may be made in the form, details and arrangements of parts without departing from the scope of my invention.

Where herein and also in the appended claims the term "pail" is used, it is used in the broadest sense to include any open top container.

What is claimed is:

1. A sealed container convertible into an open pail, having in combination an open topped body provided with a bead at its upper edge, a closed cover having its entire marginal edge rolled about said bead and so secured thereto, said cover having scored sections extending thereacross from a central portion thereof and terminating short of said rolled marginal portion and having a transverse, relatively short score line connecting the score lines defining said scored sections at the central portion of said cover through which an implement such as a screw driver may be thrust to separate the inner ends of said scored sections, said scored sections flaring in width from said central transverse score line to the edges of the pail to facilitate removal of said cover upon tearing of said scored section therefrom.

2. A sealed container convertible into an open pail, having in combination an open topped body provided with a bead at its upper edge, a closed sealing cover having its marginal edge rolled about said bead and so secured thereto, said cover having a pair of scored sections extending thereacross from the central portion, said scored sections being defined by in each instance a pair of score lines diverging from the center of said cover and terminating short of said rolled marginal edge and said sections being separated by a short, transverse score line at the central portion to facilitate penetration of said cover by an implement such as a screw driver, and subsequent separation of said scored sections and tearing thereof from said cover to leave said cover divided into portions of considerably less area than half of said cover.

HOWARD G. HORNIBROOK.